Sept. 19, 1961  E. B. GRANGE  3,000,522
PICKUP UNIT FOR HAY BALES
Filed Dec. 11, 1958

INVENTOR
EDWARD BLOOR GRANGE

BY *Edward Eversley Bishop*
ATTORNEY

United States Patent Office 3,000,522
Patented Sept. 19, 1961

3,000,522
PICKUP UNIT FOR HAY BALES
Edward Bloor Grange, Harmatton, Alberta, Canada
Filed Dec. 11, 1958, Ser. No. 779,587
2 Claims. (Cl. 214—147)

In general, this invention relates to lifting apparatus and in particular, it relates to apparatus for lifting a number of bales of hay or the like that previously have been piled together.

The principal object is to provide a lifter that is attachable and detachable quickly and easily to a common tractor front end loader.

A further object is to provide a bale lifter that will eliminate the present tedious manual lifting of single bales.

A still further object is to provide a lifter that will pick up a large number of bales at one time and thereby speed up such operation.

An additional object is to provide a lifter that may be operated by a single workman and that enables a single workman to perform work ordinarily requiring more than one workman.

A further additional object is to provide a lifter that will lift a number of bales in a pile without damage to the bales during the lifting operation.

In the agricultural industry, it has become an accepted practice to bale hay, straw and the like in bales of uniform size and then to stack these bales in a large stack at a central location. Usually the hay, straw or the like is baled in a mechanical baling device that discharges the bales along its path as it is moved over a field. It is then necessary to pile these bales into piles of ten or more as a protection against the weather and to then transfer the piles of bales to the central stack.

Generally, the small piles of bales are transferred to a suitable vehicle by one or more workmen who handle the bales singly as the vehicle is moved into position by the pile. Obviously, an operation of this sort can be extremely time consuming and tedious and will usually require at least two workmen to perform the operation satisfactorily.

It is known that bale lifting devices of the fork type that are forced beneath the pile of bales have been used in the past but I have found such devices not completely satisfactory. For example, if the field on which the piles of bales are situated is uneven, there is a tendency for the fork teeth to become embedded in the uneven ground and to become bent. In addition, there is a tendency for the fork teeth to pierce the piles of bales, to knock over the pile or, in some cases, the fork teeth will engage with the wire bale ties to break the wire tie and destroy the bale.

In the following description and in the drawings, I will describe and illustrate an improved bale lifting device to overcome the above and other difficulties inherent in apparatus presently used in this operation. It should be understood however, that while I will describe my device with a certain degree of particularity, numerous changes and modifications may be made to my apparatus without departing from the inventive spirit and scope thereof as set out in the claims.

In drawings which illustrate one preferred embodiment:

Figure 1:
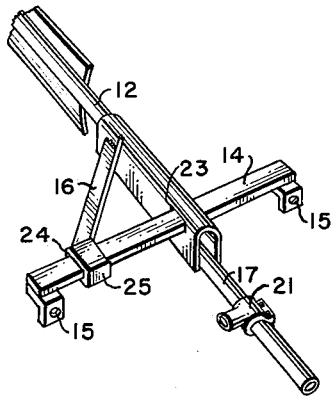
FIG. 1 is a broken away projected view of the movable clamp arm and slidable mount for the arm.

As seen in the drawings, I have illustrated a tractor 1 of conventional form with a front end loader 2 mounted thereon. Front end loaders of this type mounted on a tractor to project at the forward end thereof and controlled hydraulically from the operator's position to be raised and lowered are common in the agricultural industry and it is not considered necessary to provide further description. The attachment of various implements to the loader is made at the coupling points 3—3 of the front end loader and it should be noted that I have constructed my lifting apparatus to take advantage of this coupling.

My improved lifting apparatus comprises the framework consisting of a front member 4 with a rear member 5 spaced therefrom and secured to the front member by cross members 6 and bracing members 7. The framework is attached to the loading device 2 by the ears 8 which project from the rear member 5 and which are secured to the coupling 3 of the loader 2 by the pins 9 or other suitable means.

A stationary arm 10 is fixed rigidly to the front and rear members 4 and 5 and is positioned to project forwardly of the framework where it terminates in a pointed end 11.

A movable clamp arm 12 is constructed similarly to the fixed clamp arm 10 to terminate in a pointed end 13 and is mounted slidably at 23 on the track 14. A bracing block 25 is connected to the arm 12 through the brace 16 and the bracing block 25 is also mounted slidably at 24 to the track 14. The track 14 is secured to the front member 14 by suitable bolt means 15 or the like and downward movement of the clamp arm 12 is prevented by the second bar 17 which is fixed to the arm 12 and extends rearwardly therefrom beneath the forward member 4 to engage slidably with the underside of the rear member 5. The hydraulic cylinder 18 fixed at its one end 19 to the cross member 6 has its piston 20 secured to the connection 21 on the bar 17. In this manner, it will be obvious that extension of the piston rod 20 will react on the bar 17 to move the clamp arm 12 toward the fixed clamp arm 10 while opposite movement or retraction of the piston rod 20 into the cylinder 18 will draw the arm 12 away from the fixed arm 10. While not illustrated, hydraulic hoses from the hydraulic piston 18 to the main hydraulic cylinder of the loading device 2 as well as quick coupling connections would be provided, but, since such hose connections and other hydraulic apparatus are common and well known, it is not considered necessary to further describe and illustrate such devices.

To elevate the arms 10 and 12 from the surface of the ground with the device in its maximum lowered position, I have provided the skid pads 22 fixed to each of the arms and extending below the arms to engage with the surface of the ground. It will be noted, that the pads 22 are fixed to the arms at an angle with respect to the vertical plane of the arms so that the compression force of the arms will be directed at an upward angle as a pile of bales is grasped therebetween. This will act to prevent slippage of the bales from between the arms as the bales are being lifted.

Figure 3:
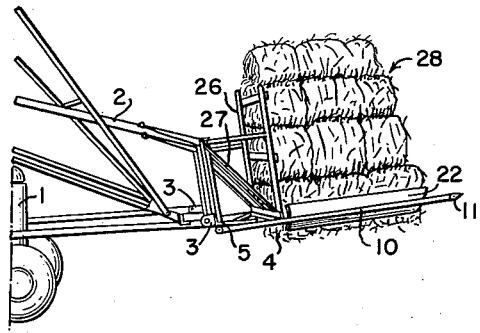
FIG. 3 is a side elevation illustrating my apparatus attached to a vehicle and in the act of lifting.
Figure 2:
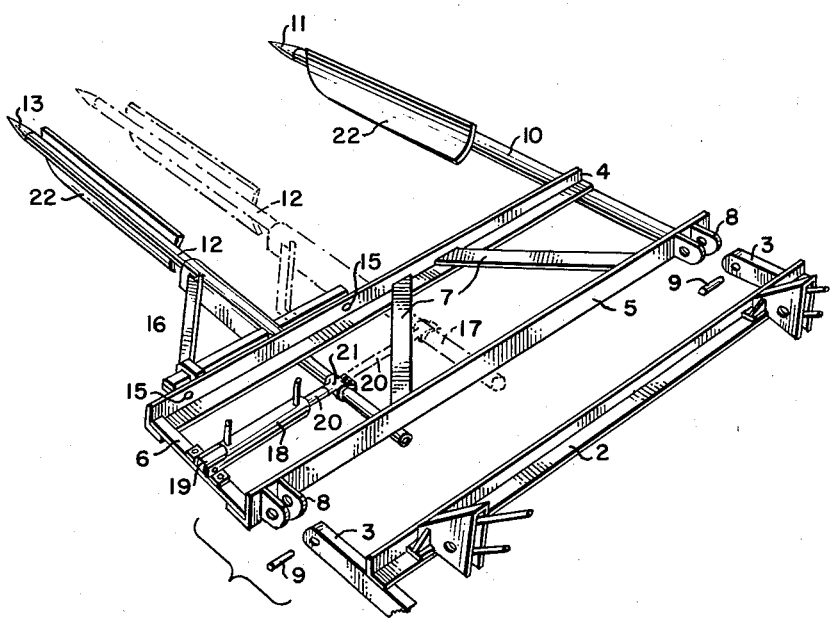
FIG. 2 is another broken away projected view illustrating the supporting framework and the attachment of the arms thereto.

In operating the device, it is simply necessary to position the movable arm 12 at a sufficient distance to allow the bottom row of a pile of bales to pass between the arms and thereafter to move the arm 12 toward the fixed arm 10 to grasp the bottom row of bales firmly therebetween. To provide additional bracing for the pile of bales grasped between the arms 10 and 12, I have added the vertical rack 26 and additional bracing 27 to the aforementioned framework and, as seen in FIG. 3 in the drawings, this will support a pile of bales 28 as they are lifted from the ground surface to a conveyance or stack.

What I claim as my invention is:

1. In combination with an hydraulic front end loading device for tractors, a pickup for bales comprising a framework adapted to be secured detachably to the said loading device, a stationary clamp arm secured rigidly to the said framework to extend forwardly from one side thereof, a movable clamp arm mounted slidably on the said one side of the framework and having a shaft extending across the framework into sliding engagement with the opposite side thereof, hydraulic ram means reactable between the said movable clamp arm and the framework to move the movable clamp arm with relation to the stationary clamp arm and skid pads secured along the said stationary and movable arms to extend below the said arms, each of such skid pads being secured to its respective arm at an angle to direct the compressive force of the arms upwardly with respect to a bale grasped therebetween.

2. The combination as claimed in claim 1 wherein there is provided a track along the said one side of the framework and spaced therefrom and the said movable clamp arm is mounted slidably on the said track and wherein the hydraulic ram means is reactable between the said shaft and the framework to move the movable clamp arm with relation to the stationary clamp arm.

References Cited in the file of this patent

UNITED STATES PATENTS

| | | |
|---|---|---|
| 2,706,570 | Jewell | Apr. 19, 1955 |
| 2,717,705 | Jacobson | Sept. 13, 1955 |
| 2,724,521 | Squires | Nov. 22, 1955 |
| 2,752,054 | Thompson | June 26, 1956 |
| 2,772,800 | Brady | Dec. 4, 1956 |
| 2,828,039 | Puim | Mar. 25, 1958 |
| 2,838,189 | Norbury | June 10, 1958 |